United States Patent [19]

Jensen

[11] Patent Number: 4,648,889
[45] Date of Patent: Mar. 10, 1987

[54] TOP INLET BAGHOUSE CONSTRUCTION

[76] Inventor: Robert M. Jensen, 210 Monte Diablo, San Mateo, Calif. 94401

[21] Appl. No.: 730,101

[22] Filed: May 3, 1985

[51] Int. Cl.[4] .......................................... B01D 46/02
[52] U.S. Cl. ................... 55/341 NT; 55/378
[58] Field of Search .......................... 55/341 NT, 378

[56] References Cited

U.S. PATENT DOCUMENTS

| | | | |
|---|---|---|---|
| 2,885,028 | 5/1959 | Sylvan | 55/341 NT |
| 3,177,636 | 4/1965 | Jensen | 55/341 NT |
| 3,429,107 | 2/1969 | Graves | 55/378 |
| 3,451,197 | 6/1969 | Ballard | 55/341 NT |
| 3,601,955 | 8/1971 | Ferri | 55/378 X |
| 4,244,718 | 1/1981 | Noddin | 55/378 X |
| 4,373,936 | 2/1983 | Becker | 55/378 X |
| 4,472,183 | 9/1984 | Mace | 55/378 |

*Primary Examiner*—Charles Hart
*Attorney, Agent, or Firm*—Thomas M. Freiburger

[57] ABSTRACT

A baghouse dust collector for top inlet operation, having an upper tubesheet and a lower tubesheet and a hopper below the lower tubesheet for collecting dust, includes an improved top end inflow thimble for the filter bags, each thimble having a generally bell-mouthed opening at its upper end for smooth inflow of gases. The thimble merely rests on the tubesheet and extends through the opening, and is sealed against leakage of unfiltered gases by a gasket. The filter bag is connected releaseably to the downwardly depending portion of the thimble, with the bag positioned over the exterior of the thimble. A connection at the bottom end of the bag releaseably retains the bottom end of the bag to the lower tubesheet at an opening, with provision for sealing against leakage of gases. A tensioning device at the lower end of the bag is used to apply tension to the bag from a position above the lower tubesheet. A special bottom-end connection may be used for maintaining tension in the bag, with a thimble collar providing adjustment of clamping position for achieving the proper tensioning. Preferably, the bag is tensioned using temporary deadweight tension.

12 Claims, 9 Drawing Figures

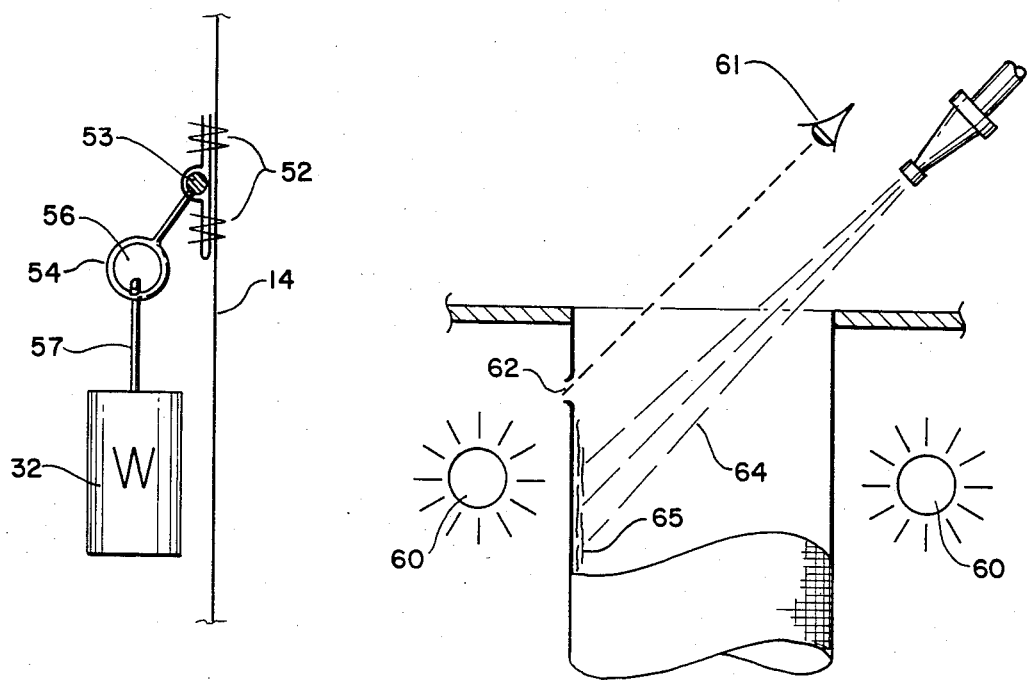
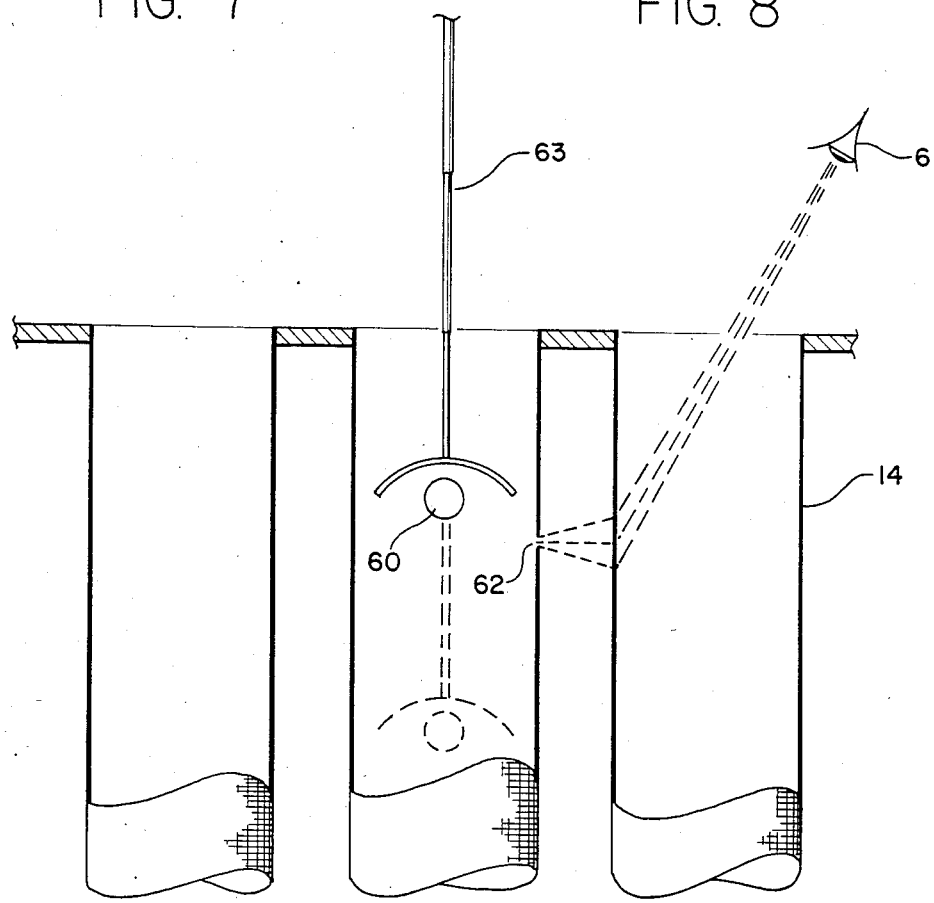
FIG. 7
FIG. 8
FIG. 9

TOP INLET BAGHOUSE CONSTRUCTION

BACKGROUND OF THE INVENTION

The invention relates to filtering equipment for dust or particle-laden gases, and more particularly to baghouse dust collectors. The invention relates specifically to top-inlet type baghouses, and includes improvements in construction for more efficient operation and maintenance of a top-inlet baghouse.

Various baghouse constructions are shown in prior U.S. patents. For example, see U.S. Pat. Nos. 2,751,042, 3,177,636 and 3,837,151. These prior patents are directed to top-inlet baghouse construction, which has been shown by the present applicant to be advantageous for several reasons, but as yet has not found widespread acceptance, most baghouses still being of the bottom-inlet type.

Sylvan U.S. Pat. No. 2,751,042 referenced above shows a top-inlet baghouse with a partially flared drop-in upper thimble, with the filter bag attached to the outside of the thimble bottom. Jensen U.S. Pat. No. 3,177,636 shows a top drop-in thimble sealed to a tubesheet by an annular gasket, and also shows bag tensioning from the bottom end using temporary dead weight.

Typical bottom-inlet baghouses have had filter bags supported at their capped top ends by a tension spring, which was intended to keep the bag tensioned. The weight of filtered dust clinging to the bag's interior would cause the bag to sag near its connected bottom end, causing problems of wear and cleaning there. Also, bottom inlet bags would tend to cause a separation or gravity gradation wherein only fines would reach the upper areas of the bag, quickly clogging these upper areas, rendering filtration less effective and cleaning more difficult.

The three patents referenced above show some features having pertinence to the present invention, but do not provide for the efficiency of gas flow and the ease of installation and maintenance of the present invention.

None of the prior art has disclosed or suggested a combination of features which would lead to the many advantages of the baghouse structure of the present invention described below.

SUMMARY OF THE INVENTION

In accordance with the present invention, a top-inlet baghouse dust collector has an upper inflow thimble for each filter bag with a generally bell-mouthed opening at its upper end for smooth inflow of gases. A peripheral flange of the thimble is supported by the tubesheet, with a lower portion of the thimble extending down through the tubesheet opening. A gasket around the tubesheet opening seals the thimble against leakage of unfiltered gases. A top-end connection for the filter bag releasably secures the filter bag to the thimble, with the bag positioned over the exterior of the thimble.

At the bottom end of the filter bag, there are provided connection means for releasably connecting the bottom end of the bag to the lower tubesheet at an opening, with sealing means for substantially sealing against leakage of unfiltered gases at the lower end. The bag is tensioned by applying a tension to the lower end of the filter bag, from a position above the lower tubesheet.

In a preferred embodiment, the bottom end connection comprises an outflow thimble affixed to the lower tubesheet opening and having an upwardly extending collar sized to extend into the bottom end of the filter bag. The filter bag is clamped onto the collar in sealed connection with the thimble. Preferably, there are included a series of horizontal flexible rings in a bottom cuff of the filter bag, and a series of spaced horizontal corrugations in the lower thimble collar. A clamp for attachment of the bag engages at least one of the flexible rings of the bag between the clamp and an annular depression of the corrugations. The clamp may itself be a wide band with one or several corrugations, so that one or several of the flexible rings are engaged in corrugations to make a sealed connection of very high integrity.

Another feature of the invention, in combination with the structure and procedure described, is the tensioning of the bag using temporary deadweight tensioning at the lower end of the bag. Several dead weights may be secured by hooks or in loops formed near the bottom end of the filter bag, to place a deadweight tension on the bag during bottom-end connection. The bottom end is then secured as described, at the appropriate level on the thimble collar, and the dead weights are removed. Such a tensioning method is far superior to the top-end tension springs often used in the prior art in connection with bottom-inlet baghouses.

A method for installing a dust filter bag in top-inlet baghouse also forms a part of the present invention. The method includes connecting the elongated filter bag onto an opening of the upper tubesheet by operations performed entirely from above the upper tubesheet. The operations include placing a gasket on the upper tubesheet opening, extending around its periphery. The top end of the bag is then fastened to a top-end thimble having a bell-mouthed opening at its upper end for smooth inflow of gases, with a peripheral flange larger in diameter than the tubesheet opening. The filter bag and the top-end thimble are then lowered down through the tubesheet opening until the thimble's peripheral flange rests against and seals on the gasket to seal the thimble to the tubesheet opening while avoiding the need for fasteners to make the seal.

When this top-end connection has been completed, the bottom end of the filter bag is sealingly connected to an opening in the lower tubesheet by operations performed from above the lower tubesheet. The lower tubesheet opening leads to a dust hopper.

When the filter bag has been installed by this method, certain very efficient inspection and cleaning methods can be used for the filter bag. Inspection can be accomplished by placing a light source outside the bag and between the upper and lower tubesheets, usually serving a plurality of such bags. An inspector visually inspects the filter bag from above by observing the interior walls of the bag from above the upper tubesheet, looking down through the top-end thimble. Alternatively, a light source can be placed inside one of the bags and lowered as an inspector looks down into each of the adjacent bags. A small hole in the bag with the light source will project light through to the wall of the bag being viewed and will be seen by the inspector.

For cleaning filter cake from the interior of the filter bag, a blast of high-velocity fluid, e.g., air or water, can be directed against the interior walls of the bag through the top-end thimble, from above the upper tubesheet. This causes the cake to fall down into the hopper.

It is therefore among the objects of the present invention to greatly improve over the structure and proce-

DESCRIPTION OF THE DRAWINGS

FIG. 7 is a detailed view showing a means for attaching a temporary dead weight tensioning to the bottom of the filter bag, during installation.

FIGS. 8 and 9 schematically indicate, in elevational section, methods for inspection and cleaning of filter bags in accordance with the invention.

DESCRIPTION OF PREFERRED EMBODIMENTS

Figure 1:
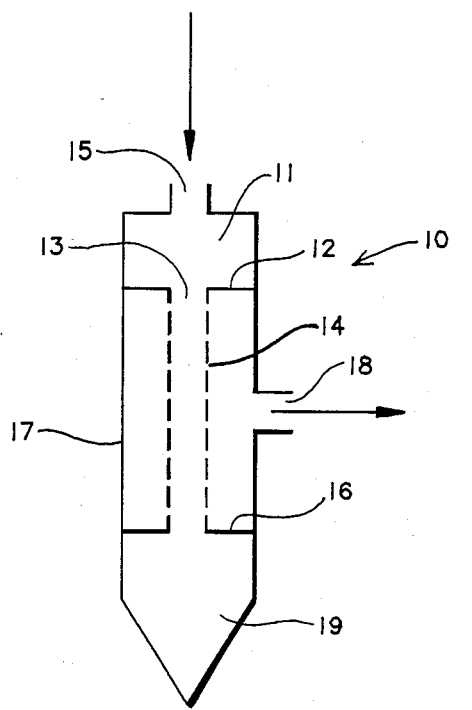
FIG. 1 is a schematic elevational view showing in general the layout of a portion of a top inlet baghouse.

In the drawings, FIG. 1 shows schematically a top inlet baghouse arrangement 10. Dust-laden gases or smoke enter via an upper plenum 11, above an upper tubesheet 12 having a plurality of openings such as the opening 13 illustrated, for flow of the gases into a dust filter bag 14. The plenum 11 is deep enough, in accordance with the present invention, to have headroom for an operator. The filter bag 14 is tensioned between the upper tubesheet 12 and a lower tubesheet 16, in generally vertical orientation. Typically, but not necessarily, the filter bag 14 will be a generally cylindrical mesh constructed of glass fibers. The baghouse 17, which is schematically indicated for simplicity in FIG. 1 as being only for a single row of bags 14, has an inlet 15 and an outlet 18 through which the filtered gases pass.

Dampers for controlling flow for normal operation, automatic cleaning and for compartment isolation are not shown in the drawings. Their presence is understood by those versed in the art.

The dust filtrate particles or cake fall down to a hopper below the filter bags 14, schematically indicated at 19 in FIG. 1. A single hopper can serve a plurality of filter bags 14.

Figure 2:
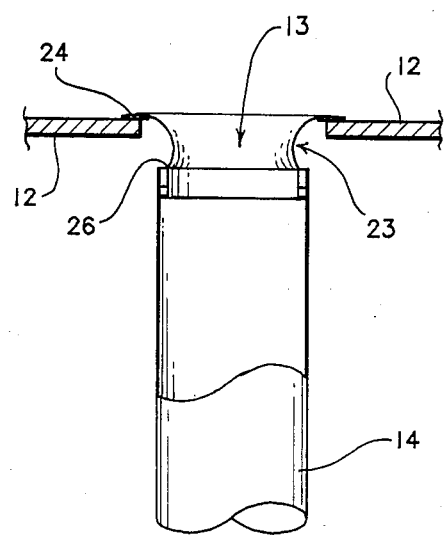
FIG. 2 is a schematic plan view showing a portion of a baghouse including a plurality of filter bags.
Figure 2:
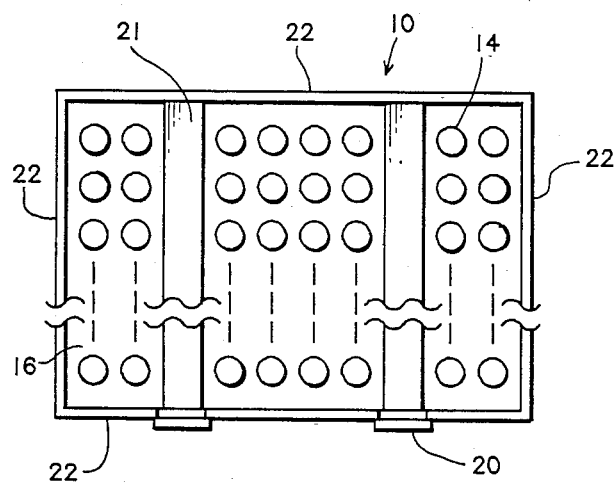

FIG. 2 shows a portion of a baghouse schematically in plan view. As indicated, such a top inlet baghouse 10 can include a large plurality of filter bags 14 in a grid or matrix of locations, with the baghouse including maintenance walkways 21 between gangs of bags. The lower tubesheet 16 includes the walkways 21, and the drawing indicates an outside wall or partition 22 for the baghouse. A walkway access door is shown at 20.

Figure 3:
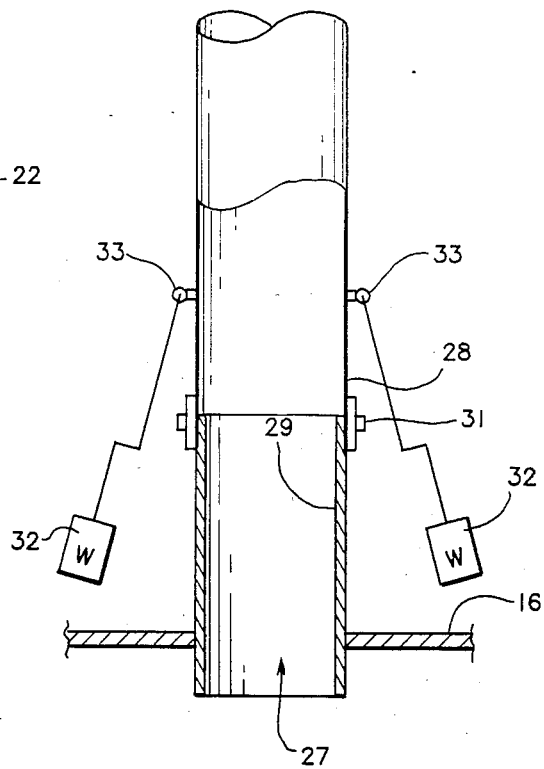
FIG. 3 is an elevational view in section showing a portion of a baghouse with a filter bag installed in position between upper and lower tubesheets, according to the system and method of the invention.

FIG. 3 shows in sectional elevation a filter bag 14 installed between the upper tubesheet 12 and the lower tubesheet 16. The assembly includes a drop-in upper thimble 23 at the tubesheet opening 13, with a conformable annular gasket 24 positioned around the tubesheet opening and against which the thimble 23, with the weight of the filter bag 14, bears. This provides an effective seal against leakage of unfiltered gases.

The bag 14, which may be in the range of about 25 to 45 bag diameters in length, is secured to a downwardly extending portion 26 of the thimble, by a method discussed below, and extends substantially vertically down to the lower tubesheet 16, at a lower opening 27. There, the lower end 28 of the filter bag is connected sealingly to the lower tubesheet opening 27 in an appropriate manner. According to the invention, this connection preferably comprises an upwardly extending collar 29 secured to the lower tubesheet 16 at the opening 27, as by welding, with the lower end of the filter bag 14 clamped to the collar 29 by an encircling clamp 31 as indicated. A specific form of this bottom end connection is described further below.

An important feature of the invention is the application of tension to the filter bag 14 from the bottom end, via dead weight tensioning means. For this purpose dead weights 32 may be connected temporarily via loops 33 provided in the exterior of the bag 14, for applying the appropriate tension while the bag is clamped onto the collar 29. The weights 32 are then removed.

Figure 4:
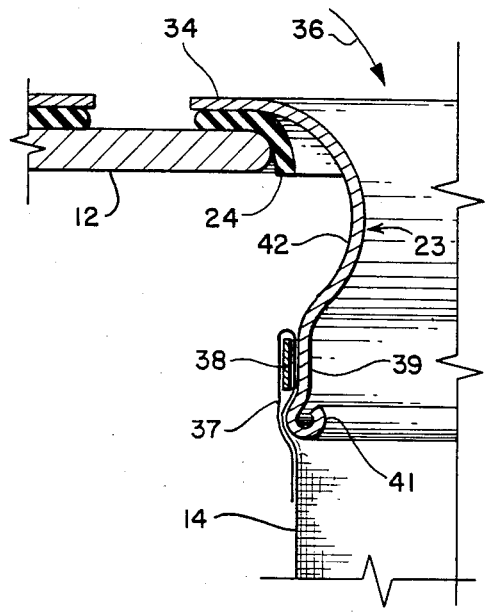
FIG. 4 is a detailed view showing a top thimble connection according to a preferred feature of the invention.

FIG. 4 shows in detail the connection to the upper tubesheet 12 at the upper end of the filter bag 14. As indicated, the upper thimble 23 includes a smooth-transition, bell-mouthed opening at its top, including an outwardly extending annular flange 34 which rests on the gasket 24 generally as shown. As illustrated in FIG. 4, gases entering the thimble 23 encounter a curving-in surface which has no sharp breaks or angles from the substantially horizontal annular flange 34 down to the lower end of the thimble. This flared or bell-mouthed opening assures that the flow of gases (see flow arrow 36 in FIG. 4) will be smooth, without sharp edges or corners which might cause turbulent flow and consequent pressure loss, as in the aforementioned prior patents and as in the sharpedged thimbles of bottom inlet baghouses.

The annular gasket 24 is seated around the tubesheet opening, fitting onto the edge of the tubesheet 12 at the opening. It is of a deformable or conformable material which when compressed will seat closely against the thimble flange 34 and the surface of the tubesheet 12 to form a substantially leakproof connection.

The filter bag 14 preferably includes a cuff 37 at its upper end, i.e., a doubled-over portion of the bag mesh, appropriately stitched or otherwise secured. A flexible ring such as a stainless steel band 38 is shown inside the cuff, preferably held therein by stitching, for supporting the bag in its installed configuration. For installation on the lower end of the thimble 23, the thimble includes a generally cylindrical collar portion 39 below which is an outwardly extending bead 41. The steel band-reinforced cuff 37 is smaller in diameter than the outer dimension of the bead 41; however, the cuff may be inserted over the bead from below by tilting the cuff and first placing it against a recessed portion 42 above, then pressing it over the bead, a feature known in the art in other baghouse constructions, such as shown generally by the Sylvan patent discussed above. This connection system has been used with prior baghouse constructions, but not in connection with the other features of the present invention.

Figure 5:
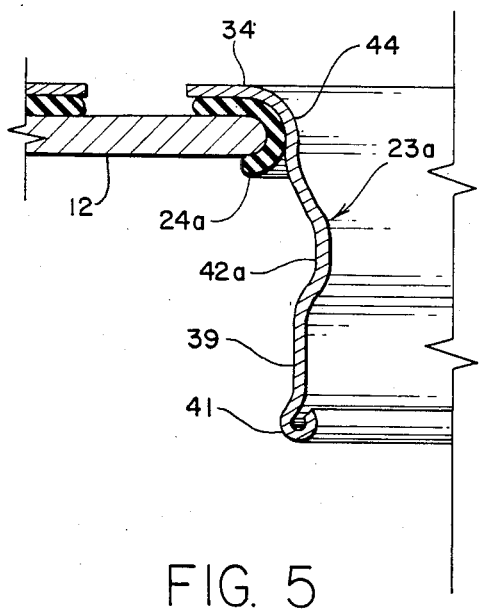
FIG. 5 shows an alternate detail for a top thimble and gasket construction for the assembly of FIG. 4.

FIG. 5 shows an alternative detail for an upper thimble 23a, with a centering feature. In accordance with this form of thimble, the gasket 24a may be a wrap-around type gasket as shown, with the thimble including an annulus 44 which is sized to engage snugly against the gasket 24a for centering of the thimble and to assist in sealing by engaging the gasket 24a between the tubesheet edge and the annulus 44.

Figure 6:
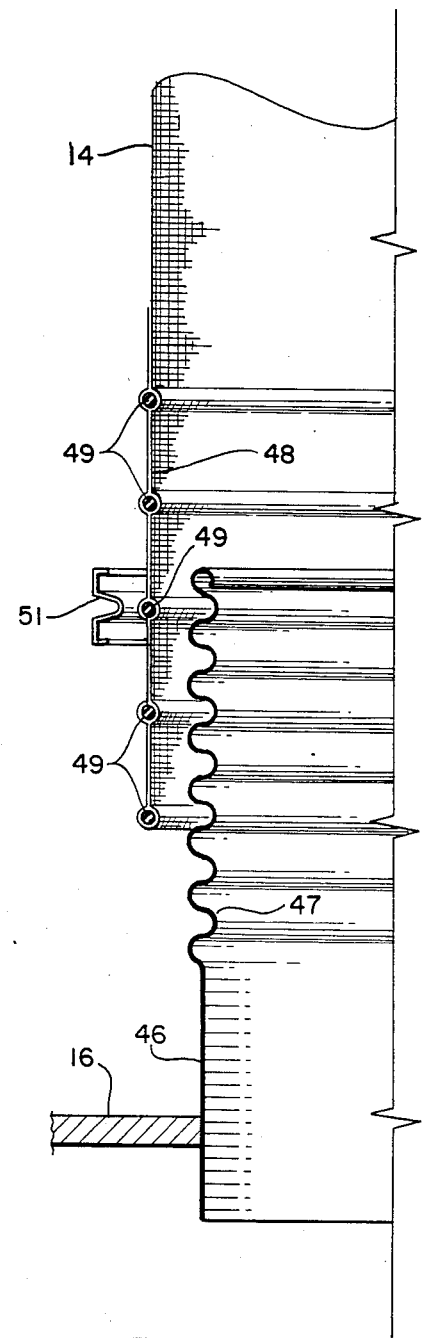
FIG. 6 is a detailed view showing the bottom end of a filter bag and system for connecting the bag to a bottom end thimble so as to maintain a desired tension in the bag.

FIG. 6 shows in enlarged view a preferred form of bottom connection for the baghouse construction of the present invention. A collar 46, preferably welded to the lower tubesheet 16 at an opening, extends upwardly a sufficient distance from the tubesheet to enable adjustable clamping of the filter bag 14 to the collar at various levels for proper tensioning. The collar, which may be called a lower thimble, includes a series of corrugations 47 according to this embodiment of the invention. The corrugations are annular, continuous around the collar 46.

The filter bag 14 includes an elongated lower cuff 48 with a series of flexible, compressible rings 49 sewn in. The rings may be ropes, for example, and are spaced vertically at equal spacing from each other as shown, to correspond generally to the spacing of corrugations 47 when the bag is connected. For example, as shown in FIG. 6, the rope rings 49 may be spaced apart a vertical distance of one or more corrugation spacings.

For attachment of the bag to the corrugated thimble 46, the bag is tensioned by applying downward force to the bag at a location near its bottom. This is accomplished preferably by the deadweight tensioning described with reference to FIG. 3. With the bag appropriately tensioned by the temporary tensioning device, an encircling clamp 51 is clamped onto the bag in such a way as to compress one or more of the flexible rings 49 tightly against one or more annular depressions of corrugations. The clamp 51 preferably is placed over the collar or thimble 46 prior to the insertion of the bag cuff over the thimble, so that the clamp does not have to be opened to fit it over the bag and thimble.

The clamp 51 may be in the corrugated configuration shown in FIG. 6, for seating in conforming relationship with the corrugations 47 of the thimble, but it may alternately be a simple flat band clamp sized to span one or more annular depressions between the corrugations 47 so as to tightly clamp the rope ring 49 therein. In the case of a flat band, the ropes are of a larger diameter, large enough when uncompressed to more than fill a depression.

The manner in which the clamp is drawn tight may be by any conventional device, such as an over-center buckle, hose clamp connection, etc.

FIG. 7 shows in greater detail features relating to the deadweight tensioning of the filter bag 14. As indicated, the bag 14 may include, near the bottom of the bag, a rigid ring 53, known in the art as an anti-collapse ring, supporting a loop device 54 of any suitable material. The loop 54, of which there may be two, three, four or more around the periphery of the bag, all attached to the ring 53, provides an opening 56 into which a hook 57 of a dead weight 32 may be temporarily inserted for the tensioning operation.

With the top inlet baghouse and filter bag connection arrangement described according to the invention, several advantages in installation, maintenance and inspection are provided which were not obtained with prior art arrangements.

For installing a filter bag of the present invention, an operator standing on the upper tubesheet first places a gasket on the tubesheet opening or the subject filter bag. He then lowers the bag through the opening, either before or after attaching the upper thimble to the bag as described above. The bag is lowered until the peripheral flange of the upper tubesheet rests against the gasket, providing the desired seal.

Once the upper connection is made, the operator (or another operator) stands on the lower tubesheet and connects the bag to the lower tubesheet thimble, preferably using temporary deadweight tensioning as described herein.

For inspection of a filter bag, there may be included one or several light sources 60 outside the bag 14 and among a plurality of bags, between the upper and lower end tubesheets, as shown in FIG. 8. These light sources are illuminated, and the operator (eye indicated at 61) can simply look down into each bag through the upper thimble, to inspect the interior of the bag. The light 60 illuminates any holes 62 in the bag, making them readily visible to the inspector.

FIG. 9 shows another inspection method by which inspection may be made, using a light source 60 inside one bag 14 and lowering it to different levels on a line 63 to illuminate any holes 62, even pinholes, in the bag. The inspector can observe projected light from the hole 62 by looking through the adjacent bag 14, where the projected light will appear when the light 60 is near that level. The inspection can also be from the lower tubesheet, by looking at adjacent bags for projected light.

For maintenance, difficult filter cakes may be removed from the interior bag wall by directing a blast of compressed air, water or other fluid 64 down through the top thimble against a cake 65, causing it to break loose and fall into the hopper.

These inspection and maintenance techniques were not possible with bottom inlet baghouses, wherein the bags were closed at the top.

The above described preferred embodiments are intended to illustrate the principles of the invention but not to limit the scope of the invention. Various other embodiments and alterations to these preferred embodiments will be apparent to those skilled in the art and may be made without departing from the essence and scope of the following claims.

I claim:

1. In a baghouse dust collector for top inlet operation, including an upper horizontal tubesheet with a plurality of openings for entry of dust-laden gases into pervious filter bags associated with the openings and arranged in groups or gangs, and hopper means below the lower ends of the filter bags for collecting dust, the improvement comprising, an inflow thimble for each filter bag, including a generally bell-mouthed opening at an upper end, free of sharp breaks or angles, for smooth inflow of gases, with a large-radius outwardly-flaring peripheral flange larger in diameter than the tubesheet opening associated with the filter bag, for support by the tubesheet with the thimble extending down through the opening, gasket means for substantially sealing the thimble with the tubesheet against leakage of unfiltered gases, top end connection means associated with a filter bag and with the thimble for releasably securing the filter bag by its top end to the thimble, with the bag positioned over the exterior of the lower end of the thimble, a gas inflow plenum above the upper tubesheet having sufficient depth to provide headroom for an operator, a lower tubesheet with openings corresponding to and below the upper tubesheet openings, the lower openings leading to the hopper means, the tubesheet openings of both the upper tubesheet and the lower tubesheet being spaced apart sufficiently for a person to walk on the lower tubesheet between groups of the filter bags and to have access to the bottom ends of the filter bags, bottom end connection means associated with the lower tubesheet for releasably connecting the bottom end of the filter bag to the lower tubesheet at an opening, by operations conducted entirely above the lower tubesheet, and including bottom end sealing means for substantially sealing against leakage of unfiltered gases, and tensioning means for applying tension to each filter bag at its lower end, from a position above the lower tubesheet, whereby, once the upper end of a filter bag has been connected via the thimble to the upper tubesheet, an operator may go onto the lower tubesheet and connect the bottom end of the filter bag via the bottom end connection means to the lower tubesheet.

2. The improvement defined in claim 1, wherein the bottom end connection means comprises an outflow thimble affixed in sealed connection to each lower tubesheet opening and having an upwardly extending collar sized to extend into the bottom end of a filter bag, and clamping means for encircling and clamping the lower end of the filter bag in a sealed, extended surface connection with the thimble.

3. The improvement defined in claim 2, wherein the filter bag includes a series of horizontal flexible rings spaced vertically from each other and enclosed in a bottom cuff of the bag, wherein the thimble collar includes corrugations spaced generally for registry with the flexible rings, and wherein the clamping means includes a generally annular clamp for clamping the bag onto the collar with at least one of the flexible rings engaged between the clamp and an annular depression of the corrugations.

4. The improvement defined in claim 3, wherein the tensioning means comprises deadweight means for temporarily applying deadweight tension on the lower end of the bag while the bag is being secured to the thimble collar.

5. The improvement defined in claim 4, wherein the bag includes loop means secured to the bag near its lower end for temporary connection of at least one dead weight to the bag to hold it in tension while it is being secured to the thimble collar.

6. The improvement defined in claim 1, wherein the tensioning means comprises deadweight means for temporarily applying deadweight tension on the lower end of the bag while the bag is being secured via said bottom end connection means.

7. The improvement defined in claim 1, wherein the outwardly-flaring peripheral flange comprises a generally horizontal annular flange curving smoothly down into a generally vertical-walled annulus sized to seat tightly against said gasket means and to compress the gasket means in the horizontal, radial direction as well as in the vertical direction, while also having the effect of centering the inflow thimble in the tubesheet opening.

8. A method for installing a dust filter bag in a baghouse for top inlet operation, the baghouse having an upper tubesheet in communication with an upper plenum and a lower tubesheet, each with a plurality of openings, comprising, connecting the elongated filter bag onto an opening of the upper tubesheet by operations performed entirely from above the upper tubesheet, the plenum having headroom for an operator, including placing a gasket on the upper tubesheet opening, extending around its periphery, fastening the top end of the bag to the outside of a top end thimble having a bell-mouthed opening at its upper end for smooth inflow of gases, with a peripheral flange larger in diameter than the tubesheet opening, lowering the filter bag and the top end thimble down through the tubesheet opening until the thimble's peripheral flange rests against and seats on the gasket to seal the thimble to the tubesheet opening while avoiding the need for fasteners to make the seal, and sealingly connecting the open bottom end of the filter bag to an opening in the lower tubesheet and tensioning the bag by operations performed entirely from above the lower tubesheet, by connecting the lower end of the bag to an upwardly extending thimble collar fixed to the lower tubesheet, the lower tubesheet opening leading to a dust hopper.

9. A method for inspecting a baghouse filter bag installed by the method of claim 8, comprising placing a light source outside the bag and between the upper and lower tubesheets, and visually inspecting the filter bag from above by observing the interior walls of the bag from above the upper tubesheet, looking down through the top end thimble.

10. A method for inspecting a baghouse filter bag installed by the method of claim 8, comprising placing a light source inside the inspected bag and observing adjacent similar bags for spots of projected light, indicating holes in the inspected bag through which light is passing, and including moving the light source to different levels inside the inspected bag while observing the adjacent bags, with the inspection conducted by an observer standing on the lower tubesheet and observing the outsides of the adjacent bags for any spots of projected light.

11. The method of claim 8, wherein the connection of the bottom end of the filter bag includes the steps of positioning the bottom end of the bag over a thimble collar extending upwardly from the lower tubesheet opening, attaching temporary deadweight tensioning devices to the bag near its bottom end, and clamping the bag to the collar in a sealed connection at a level in accordance with the deadweight tensioning, then removing the deadweight tensioning devices from the bag so that the appropriate tension remains in the bag.

12. In a baghouse dust collector for top inlet operation, including an upper horizontal tubesheet with a plurality of openings for entry of dust-laden gases into pervious filter bags associated with the openings, and hopper means below the lower ends of the filter bags for collecting dust, the improvement comprising, an inflow thimble for each filter bag, to which the top end of the filter bag is fastened, with an outwardly-flaring peripheral flange larger in diameter than the tubesheet opening associated with the filter bag, for support by the tubesheet with the thimble extending down through the opening, gasket means for substantially sealing the thimble with the tubesheet against leakage of unfiltered gases, a lower tubesheet with openings corresponding to and below the upper tubesheet openings, the lower openings leading to the hopper means, a bottom end connection comprising an outflow thimble affixed in sealed connection to each lower tubesheet opening and having an upwardly extending collar sized to extend into the bottom end of a filter bag, and the filter bag including a series of horizontal flexible rings spaced vertically from each other and enclosed in a bottom cuff of the bag, the thimble collar including corrugations spaced generally for registry with the flexible rings, and including a generally annular clamp for clamping the bag onto the collar with at least one of the flexible rings engaged between the clamp and an annular depression of the corrugations.

* * * * *